US009162222B2

(12) United States Patent
Sun et al.

(10) Patent No.: US 9,162,222 B2
(45) Date of Patent: Oct. 20, 2015

(54) METHOD FOR TUNING SURFACE STRUCTURE OF METALLIC NANO-CATALYST AND PREPARATION METHOD THEREOF

(75) Inventors: Shi-gang Sun, Fujian (CN); Rui Huang, Fujian (CN); Sheng-pei Chen, Fujian (CN)

(73) Assignee: XIAMEN UNIVERSITY, Fuijian (CN)

( * ) Notice: Subject to any disclaimer, the term of this patent is extended or adjusted under 35 U.S.C. 154(b) by 188 days.

(21) Appl. No.: 13/814,462

(22) PCT Filed: Jun. 13, 2011

(86) PCT No.: PCT/CN2011/075629
§ 371 (c)(1),
(2), (4) Date: Apr. 3, 2013

(87) PCT Pub. No.: WO2012/016478
PCT Pub. Date: Feb. 9, 2012

(65) Prior Publication Data
US 2013/0184146 A1    Jul. 18, 2013

(30) Foreign Application Priority Data
Aug. 6, 2010  (CN) .......................... 2010 1 0249163

(51) Int. Cl.
*C25D 17/02*  (2006.01)
*C25D 1/00*  (2006.01)
(Continued)

(52) U.S. Cl.
CPC ............... *B01J 37/348* (2013.01); *B01J 23/42* (2013.01); *B01J 23/44* (2013.01); *B01J 23/462* (2013.01);
(Continued)

(58) Field of Classification Search
CPC ............................... C25D 1/006; C25D 17/02
USPC .................................... 204/269, 229.4, 229.5
See application file for complete search history.

(56) References Cited

U.S. PATENT DOCUMENTS

2007/0029189 A1* 2/2007 Zach .......................... 204/228.3

FOREIGN PATENT DOCUMENTS

| CN | 101024174 A | 8/2007 |
|---|---|---|
| CN | 101554597 A | 10/2009 |
| CN | 101928979 A | 12/2010 |

OTHER PUBLICATIONS

Na Tian et al., "Synthesis of Tetrahexahedral Platinum Nanocrystals with High-Index Facets and High Electro-Oxidation Activity," *Science*, May 4, 2007, vol. 316, pp. 732-735.
(Continued)

*Primary Examiner* — Nicholas A Smith
(74) *Attorney, Agent, or Firm* — Haynes and Boone, LLP

(57) ABSTRACT

The present disclosure relates to a surface structure control and preparation process for a metal nanocatalyst involving a metal nanocatalyst. The present disclosure provides a surface structure control and continuous preparation system for a metal nanocatalyst, a metal nanocatalyst having an open surface structure and high surface energy, and a surface structure control and a preparation process thereof. The system is provided with a nucleation electrolytic cell, a distribution valve, at least two growth electrolytic cells, with two ends of the distribution valve being connected to an output port of the nucleation electrolytic cell and to input port of all the growth electrolytic cells, respectively. The metal nanocatalyst having an open surface structure is a single metal nanoscale crystal and has a high density of terrace atoms or active sites on the surface thereof. The precursor reaction solution is injected into the nucleation electrolytic cell, and a nucleation programmed potential is applied to one pair of electrodes in the nucleation electrolytic cell to obtain a nucleation reaction solution having the metal crystal nucleus formed, which is conveyed to the growth electrolytic cell through the distribution valve, a growth programmed potential is applied to one pair of electrodes in the growth electrolytic cell to obtain a metal nanoscale crystal having an open surface structure; controlling the growth time to obtain a reaction solution, and collecting a product by centrifugation.

17 Claims, 4 Drawing Sheets

(51) Int. Cl.
| | |
|---|---|
| B01J 37/34 | (2006.01) |
| B01J 35/00 | (2006.01) |
| C25D 17/00 | (2006.01) |
| C25D 1/04 | (2006.01) |
| B01J 23/42 | (2006.01) |
| B01J 23/44 | (2006.01) |
| B01J 23/46 | (2006.01) |
| B01J 23/50 | (2006.01) |
| B01J 23/52 | (2006.01) |
| B01J 23/72 | (2006.01) |
| B01J 23/745 | (2006.01) |
| B01J 23/75 | (2006.01) |
| B01J 23/755 | (2006.01) |
| B82Y 30/00 | (2011.01) |
| C25D 3/50 | (2006.01) |
| C25D 5/18 | (2006.01) |
| B01J 21/18 | (2006.01) |

(52) U.S. Cl.
CPC .............. *B01J 23/464* (2013.01); *B01J 23/468* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 35/002* (2013.01); *B01J 35/006* (2013.01); *B01J 35/0013* (2013.01); *B82Y 30/00* (2013.01); *C25D 1/006* (2013.01); *C25D 1/04* (2013.01); *C25D 17/00* (2013.01); *C25D 17/02* (2013.01); *B01J 21/18* (2013.01); *B01J 21/185* (2013.01); *C25D 3/50* (2013.01); *C25D 5/18* (2013.01)

(56) References Cited

OTHER PUBLICATIONS

Na Tian et al., "Platinum Metal Catalysts of High-Index Surfaces: From Single-Crystal Planes to Electrochemically Shape-Controlled Nanoparticles," J. Phys. Chem. C., 2008, vol. 112, pp. 19801-19817.

Yan-Xin Chen et al., Tuning the Shape and Catalytic Activity of Fe Nanocrystals from Rhombic Dodecahedral and Tetragonal Bipyramids to Cubes by Electrochemistry, *J. Am. Chem. Soc.*, 2009, vol. 131, pp. 10860-10862.

Na Tian et al., Direct Electrodeposition of Tetrahexahedral Pd Nanocrystals with High-Index Facets and High Catalytic Activity for Ethanol Electrooxidation, *J. Am. Chem. Soc.* 2010, vol. 132, pp. 7580-7581.

Zhi-You Zhou et al., High-Index Faceted Platinum Nanocrystals Supported on Carbon Black as Highly Efficient Catalysts for Ethanol Electrooxidation, Angew. Chem. Int. Ed., 2010, vol. 49, pp. 411-414.

WIPO, PCT/CN2011/075629, International Search Report, Sep. 1, 2011, 6 pgs.

\* cited by examiner

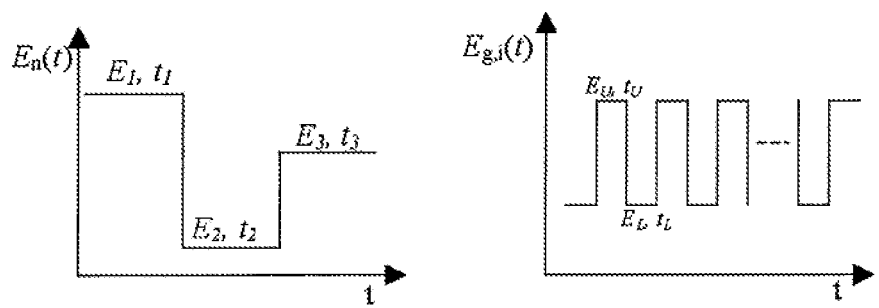
Fig. 4
Fig. 5
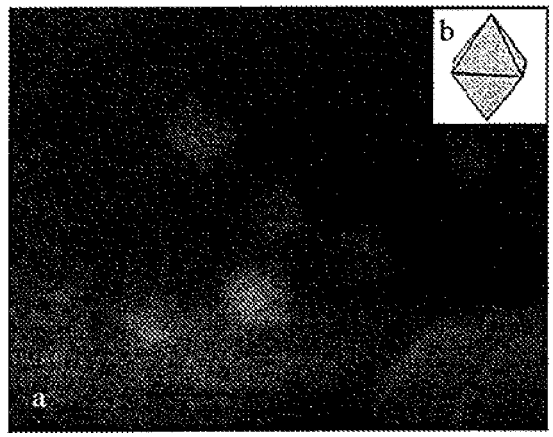
Fig. 6
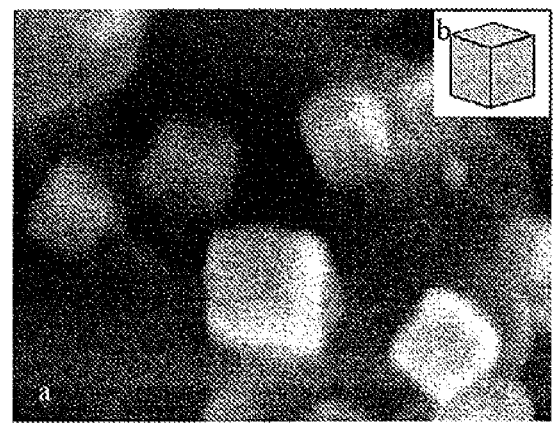
Fig. 7
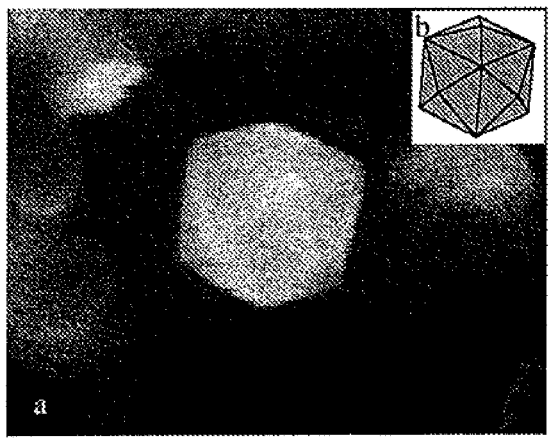
Fig. 8
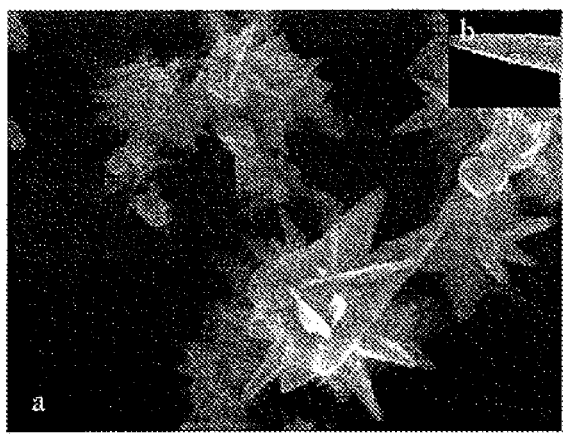
Fig. 9

METHOD FOR TUNING SURFACE STRUCTURE OF METALLIC NANO-CATALYST AND PREPARATION METHOD THEREOF

CROSS-REFERENCE TO RELATED APPLICATIONS

This is the national stage of PCT/CN2011/075629, filed Jun. 13, 2011, which claims the benefit of CN 201010249163.5, filed Aug. 6. 2010, the contents of each of which is hereby incorporated herein in its entirety by express reference thereto.

TECHNICAL FIELD

The present application relates to a metal nanocatalyst, in particular a process of surface structure control and continuous preparation of a metal nanocatalyst having an open surface structure and a high surface energy.

BACKGROUND ART

Nanomaterials are characterized in particular physical/chemical properties such as small size effect, surface effect, quantum tunneling effect, etc. Metal nanomaterials become important catalysts because of the excellent properties. Commonly used metal catalysts include generally platinum metals, coinage metals, ferric metals, etc., and are widely used for energy conversion, petroleum chemistry, purification of exhaust gas of automobiles and chemical industries. It has been always an important issue in the field for how to improve the metal nanocatalyst in the activity, selectivity, stability and use efficiency. Taking platinum metal catalyst as an example, a study employing platinum single crystal surface as a model catalyst exhibits that, performance of the catalyst depends on the catalyst's surface structure. A high-index crystal surface having an open structure and high surface energy has the catalytic activity and stability remarkably advantageous over a low-index crystal surface whereon atoms are tightly lined up (see reference document: [1] Na Tian, Zhi-You Zhou, Shi-Gang Sun, Platinum Metal Catalysts of High-Index Surfaces: From Single-Crystal Planes to Electrochemically Shape-Controlled Nanoparticles. J. Phys. Chem. C., 2008, 112: 19801-19817). Fundamental studies on other metal catalysts gave the similar conclusion, i.e., the surface structure is the decisive factor of performance of the metal catalysts, and a catalyst having an open surface structure has a higher activity and stability. Further, different surface structures may have particular catalytic property with respect to special reaction, i.e., exhibiting catalytic selectivity of surface structure. Currently, commercially available metal nanocatalysts are particles or crystals of several nanometers in size, and their surfaces have a structure of crystal planes with compact atomic arrangement. As the surface structure of a nanocrystal is determined by the shape of the nanocrystal, changing the shape of the prepared nanocrystal can change the surface structure, and thus control the activity and selectivity of the metal nanocatalyst at the level of atomic arrangement structure.

First of all, depositing platinum nanospheres on surface of glassy carbon electrodes, then appling square wave potential treatment to the surface to dissolve the platinum sphere and allow nucleation growth again. With respect to this, the present applicant ([2] Na Tian, Zhi-You Zhou, Shi-Gang Sun, Yong Ding, Zhong Lin Wang, Synthesis of Tetrahexahedral Platinum Nanocrystals with High-Index Facets and High Electro-Oxidation Activity. Science, 2007, 316: 732-735; [3] Chinese patent ZL 2007 1 0008741.4, platinum tetrahexahedral nanocrystal catalyst and preparation and use thereof) has prepared successfully the tetrahexahedral platinum nanocrystal catalyst, which has an activity 2-4 times of the commercially available platinum nanocatalyst. Further employing the process of direct electro-deposition, the present applicant ([4] Na Tian, Zhi-You Zhou, Neng-Fei Yu, Li-Yang Wang, Shi-Gang Sun, Direct Electrodeposition of Tetrahexahedral Pd Nanocrystals with High-Index Facets and High Catalytic Activity for Ethanol Electrooxidation, J. Am. Chem. Soc. 2010, 132: 7580-7581) further prepared palladium tetrahexahedral nanocrystal catalyst. The study results show that the platinum nanocatalyst having an open surface structure has a high density of active site, thus improving the catalytic activity remarkably. The present applicant ([5] Zhi-You Zhou, Zhi-Zhong Huang, De-Jun Chen, Qiang Wang, Na Tian, and Shi-Gang Sun, High-Index Faceted Platinum Nanocrystals Supported on Carbon Black as Highly Efficient Catalysts for Ethanol Electrooxidation, Angew. Chem. Int. Ed. 2010, 49: 411-414.) mixes platinum precursor and carbon black, and drops the mixture onto surface of glassy carbon electrodes, and carries out a square wave potential treatment to prepare a carbon-supported high-index faceted platinum nanocatalyst, further improving the utilization efficiency of platinum. The present applicant ([6] Yan-Xin Chen, Sheng-Pei Chen, Zhi-You Zhou, Na Tian, Yan-Xia Jiang, Shi-Gang Sun, Yong Ding, Zhong Lin Wang, Tuning the Shape and Catalytic Activity of Fe Nanocrystals from Rhombic Dodecahedral and Tetragonal Bipyramids to Cubes by Electrochemistry, J. Am. Chem. Sco. 2009, 131: 10860-10862) further prepares iron nanocrystal catalysts having various shapes such as rhombic dodecahedron, tetragonal bipyramids, 18-facet polyhedra, and cube on surface of glassy carbon electrodes with electrochemical method, which have very high electro-catalytic activity with respect to the reduction of nitrite. Studies also reveal the rule that more open of the surface structure of the metal catalyst, the higher the catalytic activity is.

It is worthy of pointing out that the above metal nanocatalysts having an open surface structure all grow on surface of glassy carbon electrodes, form at most one layer of metal nanocrystal with very few amount, and can hardly be used to practical catalytic system and industrial processes. There is yet no report about the preparation technology of adding metal precursor to the flowing liquid-phase reaction solution as a metal source, and the metal is controlled for nucleation first and growing later with the programmed potential.

CONTENTS OF INVENTION

The first object of the present application is to provide a surface structure control and preparation system for a metal nanocatalyst with respect to the requirement of further improving activity, selectivity and stability of the metal nanocatalysts in practical application field.

The second object of the present application is to provide a metal nanocatalyst having an open surface structure.

The third object of the present application is to provide a surface structure control and preparation system for a metal nanocatalyst having an open surface structure.

The surface structure control and preparation system for the metal nanocatalysts of the present application is a surface structure control and preparation system for a metal nanocatalyst having an open surface structure.

The surface structure control and preparation system for the metal nanocatalysts has a nucleation electrolytic cell, a distribution valve, at least two growth electrolytic cells, with one end of the distribution valve being connected to an output port of the nucleation electrolytic cell and the other end of the distribution valve being connected to input ports of all the growth electrolytic cells.

The nucleation electrolytic cell has a cell body of the nucleation electrolytic cell and one pair of nucleation electrodes. The cell body of the nucleation electrolytic cell has an input port of the reaction solution and an output port of a nucleation reaction solution. The input port of the reaction solution is connected outwardly to an input device of the precursor reaction solution, and the outlet port of the nucleation reaction solution is connected to an entrance end of the distribution valve; one pair of the nucleation electrodes is disposed inside the cell body of the nucleation electrolytic cell, and said one pair of the nucleation electrodes is applied with nucleation programmed potential. During practical application, said one pair of nucleation electrodes is connected outwardly to equipment such as potentiostat, etc., and nucleation programmed potential can be applied.

Each of the at least two growth electrolytic cells are provided with a cell body of the growth electrolytic cell and one pair of growth electrodes, the cell body of the growth electrolytic cell is equipped with an input port of the nucleation reaction solution and an outlet port of a product. The input port of the nucleation reaction solution is connected with the output port of the nucleation electrolytic cell via the distribution valve; one pair of growth electrodes is disposed inside the cell body of the growth electrolytic cell; said one pair of growth electrodes is applied with growth programmed potential. During practical application, said one pair of the growth electrodes is connected to equipment such as potentiostat, etc., and growth programmed potential can be applied.

The cell body of the nucleation electrolytic cell may have a structure the same as that of the cell body of the growth electrolytic cell; structures of cell bodies of the nucleation electrolytic cell and growth electrolytic cells include geometric shape, electrode material, size, disposition manner, etc.

The nucleation electrodes can be plate electrodes. The plate electrodes may have an aspect ratio of 1 to 2:1, the length of the plate electrodes may be 1 cm to 10 cm, and the distance between the plate electrodes may be 20 μm to 2000 μm. It is most preferred that the plate electrodes are inserted in parallel inside the cell body of the nucleation electrolytic cell so that the precursor reaction solution flows through between two plate electrodes, and the related reaction occurs at the same time. It is to say that the precursor reaction solution forms metal crystal nucleus in the nucleation electrolytic cell; the nucleation electrodes can be carbon electrodes, metal electrodes or alloy electrodes, and the alloy electrodes can be stainless steel electrodes, etc.

The growth electrodes can be plate electrodes having an aspect ratio of 1 to 2:1, a length of 1 cm to 10 cm, and a distance between the plate electrodes of 20 μm to 2000 μm. It is most preferred that the plate electrodes are inserted in paralleled inside the cell body of the growth electrolytic cell so that the reaction solution that has formed metal crystal nucleus in the nucleation electrolytic cell is conveyed to the growth electrolytic cell via the distribution valve to complete the surface structure control and growing process of the metal nanocrystal; the growth electrodes may be carbon electrodes, metal electrodes or alloy electrodes, and the alloy electrodes can be stainless steel electrodes, etc.

The growth electrodes and the nucleation electrodes can be the same, and the word "same" means that both of them have the same geometric shape, size, material, etc.

The nucleation programmed potential consists of functional potentials of time; the growth programmed potential consists of functional potentials of time.

The nucleation programmed potential is stepped functional potential and applied to one pair of electrodes in the nucleation electrolytic cell, with an upper potential limit of 1 V to 2 V together with a retention time of 10 s to 300 s, as well as a lower potential limit of −2 V to 0.5 V together with a retention time of 10 s to 300 s.

The growth programmed potential is a square wave functional potential and applied to one pair of electrodes in the growth electrolytic cell, with an upper potential limit of 1 V to 5 V, a lower potential limit of −1.5 V to 0.5V, a potential waveform frequency of 5 Hz to 50 Hz, and a growth time of 1 min to 200 min. The growth programmed potential applied to the different growth electrolytic cells can be controlled the same or different depending on variation of different growth electrolytic cells.

When the growth programmed potentials applied to different growth electrolytic cells are the same, metal nanocatalysts having the same open surface structure can be produced. Under this condition, if different growth electrolytic cells are controlled to have different growth times, metal nanocatalyst having the same open surface structure but different sizes can be prepared; when the growth programmed potentials applied to each growth electrolytic cell are all different, metal nanocatalysts having different open surface structure can be prepared.

The precursor reaction solution consists of the following components with the content at mass ratio of: metal precursor:carrier:electrolyte:additive=1:(0.1 to 5):(10 to 100):(0.1 to 10), more preferable 1:(2.5 to 5):(10 to 30):(1 to 2).

The metal precursor can be selected from the corresponding metal salt or metal oxide. The metal salt can be selected from one of potassium chloroplatinate, sodium chloroplatinate, platinum nitrate, platinum chloride, palladium chloride, ammonium palladium chloride, iridium chloride, ruthenium chloride, rhodium chloride, osmium chloride, gold chloride, silver nitrate, copper chloride, ferric chloride, ferric sulfate, cobalt chloride, nickel sulfate; the metal oxide can be selected from one of platinum oxide, palladium oxide, iridium oxide, rhodium oxide, ruthenium oxide, osmium oxide, gold oxide, silver oxide, copper oxide, ferric oxide, cobalt oxide, and nickel oxide.

The metal precursor can also be selected from one of chloroplatinic acid, chloropalladic acid, chloroauric acid, and chloroiridic acid.

The carrier can be selected from one of the following materials: carbon black, active carbon, mesoporous carbon, and carbon nano-tubes.

The electrolyte can be selected from one of sulfuric acid, perchloric acid, nitric acid, sodium hydroxide, potassium hydroxide, sodium bicarbonate, and potassium bicarbonate.

The additive can be selected from one of the following reagents: ascorbic acid, citrate salt, glucose, oleylamine, oleic acid, hexadecylamine, hexadecyl trimethyl ammonium bromide, sodium lauryl benzenesulfate, N-isopropyl acrylamide, and polyvinyl pyrrolidone.

The precursor reaction solution many have a pH from 0.1 to 13, and more preferably, pH is from 0.1 to 3, 6.5 to 7.5, or 10 to 13.

The metal nanocatalyst having different open surface structure of the present application is a single metal nanoscale crystal, and has a high density of terrace atoms or active sites on the surface thereof. The single metal nanoscale crystal can be a single metal nanoscale simple-form crystal or a single metal nanoscale deformed crystal. The nanoscale simple-form crystal is a polyhedron, and the polyhedron can be selected from one of tetrahedron, octahedron, cube, dodecahedron, tetrahexahedron, trisoctahedron, trapezohedron and hexoctahedron; and the single metal nanoscale deformed crystal can be selected from one of deformation twins, deformed nanostick, and nano-thorn.

The metal nanocatalyst can be selected from one of platinum nanocatalyst, palladium nanocatalyst, iridium nanocatalyst, rhodium nanocatalyst, ruthenium nanocatalyst, osmium nanocatalyst, gold nanocatalyst, silver nanocatalyst, copper nanocatalyst, iron nanocatalyst, cobalt nanocatalyst, and nickel nanocatalyst.

The surface structure control and preparation process for the metal nanocatalyst having an open surface structure of the present application uses the surface structure control and preparation system of the metal nanocatalyst, and comprises the specific steps of:

1) injecting a precursor reaction solution into a nucleation electrolytic cell, meanwhile, applying a nucleation programmed potential to one pair of electrodes in the nucleation electrolytic cell; the metal precursor undergoes a nucleation reaction under the action of the nucleation programmed potential to obtain a nucleation reaction solution having the metal crystal nucleus formed;

2) conveying the nucleation reaction solution containing the metal crystal nucleus to any one of the growth electrolytic cells through the distribution valve, meanwhile, applying the growth programmed potential to one pair of the electrodes in the growth electrolytic cell; the metal crystal nucleus in the nucleation reaction solution grow gradually under the action of the growth programmed potential with the shape and surface structure of the metal crystal being controlled at the same time, to grow a metal nanoscale crystal having an open surface structure;

3) controlling the growth time of the action of the growth programmed potential applied to one pair of electrodes in any one of the growth cells in step 2), to obtain a reaction solution of the metal nanocatalyst having an open surface structure and a desired size; and 4) discharging the reaction solution of the metal nanocatalyst having an open surface structure and the desired size obtained in step 3), collecting a product by centrifugal separation, to prepare the metal nanocatalyst having an open surface structure.

Comparing with the methods of producing a metal nanocatalyst in the prior art, the present invention has the following advantages:

1) the surface structure control and preparation process for the metal nanocatalyst uses reaction apparatus having simple structure, and the reaction apparatus can be operated easily and used for continuous preparation.

2) increasing numbers of the nucleation electrolytic cells and the correspondingly matched growth electrolytic cells to achieve scaled production.

3) the electrodes used in the surface structure control and preparation process for the metal nanocatalyst can be conductive materials such as carbon, metal or alloy.

4) metals in the surface structure control and preparation process for the metal nanocatalyst are from metal precursor added to the precursor reaction solution, and the growth of the metal nanocrystal is achieved in liquid phase.

5) the metal nanocatalyst prepared in the surface structure control and preparation process for the metal nanocatalysts has controllable surface structure comparing to commercially available catalysts.

6) the electrochemistry programmed potential may be used to induce the growth process of the nanoparticles and control the crystal morphology of nanoparticles, thus determining that the present invention can prepare a metal nanocatalyst having selectable different open surface structure, with remarkable catalytic activity and selectivity over the commercially available metal nanocatalyst.

7) the metal nanocatalyst prepared according to the surface structure control and preparation process for the metal nanocatalyst can be a single metal nanoscale single-form crystal which can have shapes of regular crystal structures such as tetrahedron, octahedron, cube, dodecahedron, tetrahexahedron, trisoctahedron, trapezohedron and hexoctahedron, and can also be a single metal nanoscale deformed crystal which comprises deformation twins, deformed nanostike, nano-thorn, etc.

8) the metal nanocatalyst prepared according to the surface structure control and preparation process for the metal nanocatalyst may have controllable particle size of nanoparticles. The metal nanocatalysts having different particle sizes can be obtained by changing the nucleation time and growth time, and the particle size can be controlled in a range from 2 nm to 200 nm 9) the metal nanocatalyst prepared according to the surface structure control and preparation process for the metal nanocatalyst may have a controllable support status. The compositions of the precursor reaction solution may be varied to selectively prepare a non-supported and supported catalyst, and the supported catalyst may have different supports.

10) the metal nanocatalyst having an open surface structure prepared according to the surface structure control and preparation process for the metal nanocatalyst can be used widely for important fields such as energy conversion, petroleum chemistry and chemical industry. The metal nanocatalyst having an open surface structure is used in fuel cells as an electrocatalyst, and increases remarkable the output powder of fuel cells. The metal nanocatalyst having an open surface structure is used, as a multi-phase catalyst, in industrial processes such as catalytic reforming of hydrocarbon, chemical synthesis, etc. which can improve selectivity and yield of reaction significantly.

DESCRIPTION OF DRAWINGS

In FIG. 1, 1 is an upper lid, 2 is a sealing gasket, and 3 is a cell body.

In FIG. 2, 3 is a cell body, 4 is a lead, 5 is an inner gasket, 6 is a screw hole, 7 is an electrode, A is a chunnel.

In FIG. 3, a reaction solution P, a nucleation electrolytic cell 31, a distribution valve M, a growth electrolytic cells 321 to 325, a product 331 to 335; a nucleation potential $E_n(t)$, a growing potential $E_{g,i}(t)$.

FIG. 4 is the pictorial drawing of nucleation programmed potential step (or nucleation potential) $E_n(t)$ applied to the nucleation electrode in the preparation process according to Example 2 of the present invention. In FIG. 4, x-coordinate represents a reaction time t, y-coordinate represents an electrode potential $E_n(t)$.

FIG. 5 is the pictorial drawing of the growth programmed potential (or growing potential) $E_{g,i}(t)$ applied to the growth electrode during the preparation process according to Example 2 of the present invention. In FIG. 5, x-coordinate represents a reaction time t, y-coordinate represents an electrode potential $E_{g,i}(t)$.

FIG. 6 is an image of scanning electron microscope (SEM) of the platinum octahedron nanocatalyst prepared according to Example 3 of the present invention. In FIG. 6, a is an image of scan electron microscope, b is an image of the structural model of the corresponding platinum octahedron.

FIG. 7 is an image of the scanning electron microscope (SEM) of the platinum cube nanocatalyst prepared according to Example 4 of the present invention. In FIG. 7, a is an image of scan electron microscope, b is an image of the structural model of the corresponding platinum cube.

FIG. 8 is an image of the scanning electron microscope (SEM) of the platinum tetrahexahedral nanocatalyst prepared according to Example 5 of the present invention. In FIG. 8, a is an image of scan electron microscope, b is an image of the structural model of the corresponding platinum icositetrahedron.

FIG. 9 is an image of the scanning electron microscope (SEM) of the platinum thorn sphere nanocatalyst prepared according to Example 6 of the present invention. In FIG. 9, a is an image of scan electron microscope, b is an image of the high resolution scanning electron microscope (SEM) of the corresponding platinum thorn sphere terminal.

In FIG. 10, the scale is 50 nm.

In FIG. 11, the structural model at the left lower corner is the image of the structural model corresponding to the nanoparticles in frame portion; the scale is 200 nm In FIG. 12, x-coordinate represents the working electrode potential E/V (SCE, saturated calomel electrode as the reference electrode), y-coordinate represents current density $j/mA\ cm^{-2}$; curves a and b represent the platinum nanocatalyst having the open structure and the carbon-supported platinum catalyst made by the U.S. E-TEK Corporation (platinum content of 20 wt %), the solution during measurement is 0.1M ethanol and 0.1M sulfuric acid, the temperature during measurement is 60° C.

In FIG. 13, the scale is 50 nm.

In FIG. 14, x-coordinate represents the working electrode potential E/V (SCE, saturated calomel electrode as the reference electrode), y-coordinate represents current density $j/mA\ cm^{-2}$; curves a and b represent the platinum nanocatalyst having an opened structure and the carbon-supported platinum catalyst made by the U.S. E-TEK Corporation (platinum content of 20 wt %), the solution during measurement is 0.1M ethanol and 0.1M sulfuric acid, the temperature during measurement is 60° C.

SPECIFIC MODE FOR CARRYING OUT THE INVENTION

The following Examples will further illustrate the present invention in cooperation with the figures.

EXAMPLE 1

Figure 1:
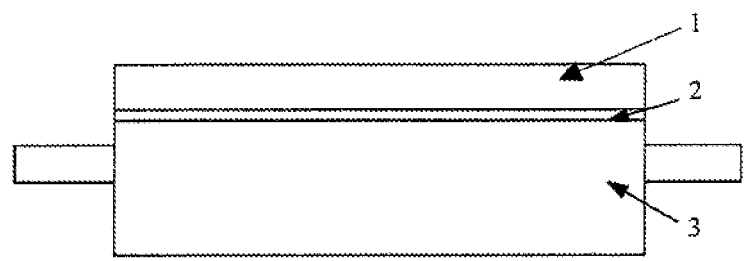
FIG. 1 is the front view of appearance of the nucleation electrolytic cell or growth electrolytic cell according to Example 1 of the present invention.
Figure 2:
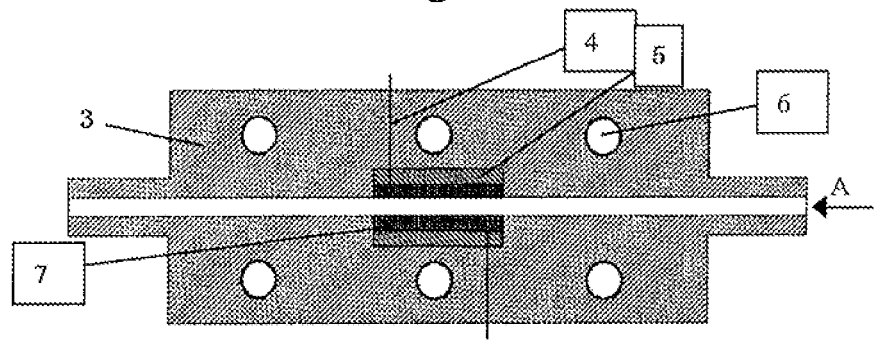
FIG. 2 is the structural pictorial drawing of horizontal cross-section of the nucleation electrolytic cell or growth electrolytic cell according to Example 1 of the present invention.
Figure 3:
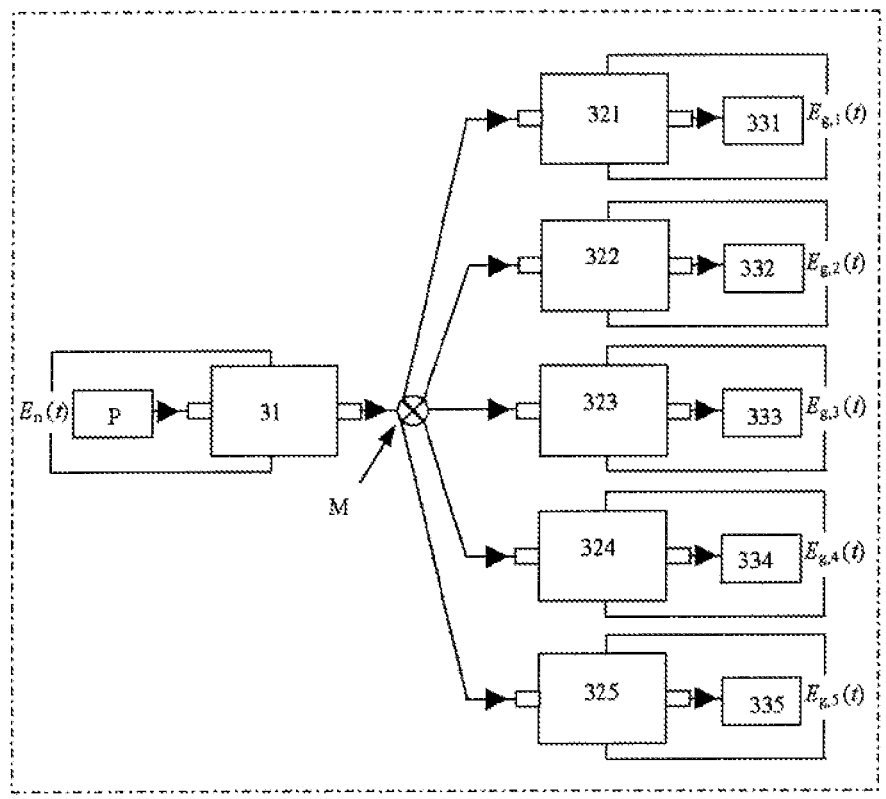
FIG. 3 is compositional pictorial drawing of the surface structure control and preparation system of the metal nanocatalyst described in Example 2 of the present invention.

Referring to FIGS. 1 to 3, the surface structure control and preparation system of the metal nanocatalyst is designated as follows: the nucleation electrolytic cell 31 and the growth electrolytic cells 321 to 325 have the same geometric dimension and interior structure; the cell body 3 of the electrolytic cell is molded by processing of organic glasses, polytetrafluoroethene or other insulation material; a pair of conductive plate electrodes are inserted in parallel into the cell body 3 of the electrolytic cell; and the gap between the two electrodes is the reaction space. A precursor reaction solution P is injected into the nucleation electrolytic cell 31 for reaction, and then, after formation of the crystal nucleus, flowed into a plurality of the growth electrolytic cells 321 to 325 via the distribution valve M to complete the growth of nanoparticles, resulting in products 331 to 335. One pair of conductive plate electrodes 7 are inserted directly into a groove in center of the cell body 3 of the electrolytic cell, with the distance between the two electrodes 7 being controlled by adjusting the thickness of an inner gasket 5. The electrodes 7 is soldered with a lead 4 on top and connected to a potentiostat outside. A flowing channel A of the reaction solution is reserved in the middle of the cell body 3 of the electrolytic cell. A layer of sealing gasket 2 is covered on top of the cell body 3 of the electrolytic cell, and the electrolytic cell is sealed by the upper lid 1 with a screw.

EXAMPLE 2

Surface structure control and preparation for the metal nanocatalyst: a precursor reaction solution P is flowed into the nucleation electrolytic cell 31. A nucleation programmed potential $E_n(t)$ is applied on both ends of the nucleation electrodes (wherein E represents potential, n represents nucleation, and t represents time) to induce nanoparticle crystal nucleus flowing into the growth electrolytic cells 321 to 325 after growth. A growth programmed potential $E_{g,i}(t)$ is applied to both ends of the growth electrodes (wherein E represents potential, g represents growth, i represents sequence of the growth electrolytic cell, and t represents time) to complete growth of the nanocrystals. As the nucleation time is comparatively shorter, a plurality of parallel growth electrolytic cells may be arranged based on a ratio of the growth time to the nucleation time (it has five growth electrolytic cells 321 to 325 in FIG. 3) to accomplish continuous preparation of the metal nanocatalysts. FIG. 3 is the pictorial drawing of the compositions of the surface structure control and preparation system for the metal nanocatalyst described in Example 2 of the present invention. FIG. 4 is the pictorial drawing of the nucleation programmed potential (or named nucleation potential) $E_n(t)$ applied to the nucleation electrodes. FIG. 5 is the pictorial drawing of growth programmed potential (or named growth potential) $E_{g,i}(t)$ applied to the growth electrodes.

EXAMPLE 3

A preparation process similar to that in Example 2 is used when preparing the platinum nanocatalyst: metal platinum is used as electrodes; the precursor reaction solution comprises platinum precursor and carbon black (carbon black as a carrier); the growth programmed potential has an upper potential limit of 1.2 V, a lower potential limit of −0.8 V, a frequency of 10 Hz, and a growth time of 90 min. The prepared platinum nanocatalyst has an appearance of octahedron. FIG. 6 is the SEM figure of the platinum octahedron nanocatalyst and the model figure of the corresponding platinum octahedron structure.

EXAMPLE 4

A preparation process similar to that in Example 3 is used when preparing the platinum nanocatalyst with exception that the growth programmed potential has an upper potential limit of 1.4 V and a lower potential limit of −0.8 V to prepare a platinum nanocatalyst having an appearance of cube. FIG. 7 is the SEM figure of the platinum cubic nanocatalyst and the model figure of the corresponding platinum cubic structure.

EXAMPLE 5

A preparation process similar to that in Example 3 is used when preparing the platinum nanocatalyst with exception that the growth programmed potential has an upper potential limit of 1.6 V and a lower potential limit of −1.2 V to prepare a platinum nanocatalyst having an appearance of icositetrahedron. FIG. 8 is the SEM figure of the platinum tetrahexahedral nanocatalyst and the model figure of the corresponding platinum tetrahexahedral structure.

EXAMPLE 6

A preparation process similar to that in Example 3 is used when preparing the platinum nanocatalyst with exception that the growth programmed potential has an upper potential limit of 1.8 V and a lower potential limit of −1.4 V to prepare a platinum nanocatalyst having an appearance of thorn sphere. FIG. 9 is the SEM figure of the platinum thorn sphere nanocatalyst and the high resolution SEM figure of the terminal of thorn sphere.

EXAMPLE 7

Figure 10:
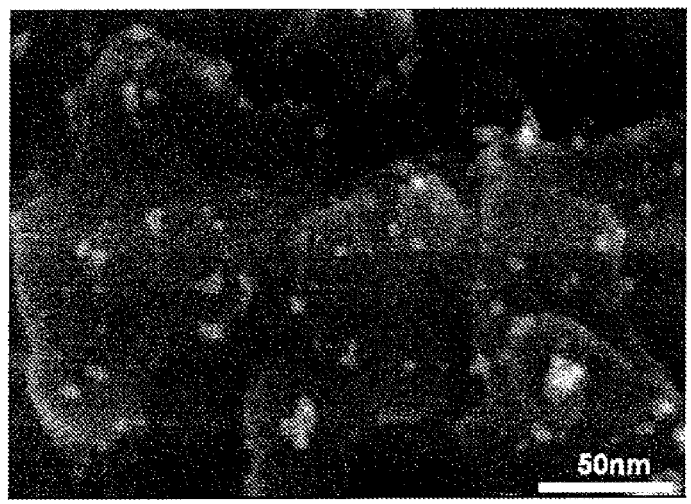
FIG. 10 is an image of scanning electron microscope (SEM) of the platinum nanocatalyst having an average particle size of 4 nm prepared according to Example 7 in the present invention.

A preparation process similar to that in Example 2 is used when preparing the platinum nanocatalyst: metal platinum is used as electrodes; the reaction solution comprises 0.5 g/L of carbon black as a carrier and 0.02 mM of chloroplatinic acid as a metal precursor; the growth programmed potential has an upper potential limit of 1.6 V, a lower potential limit of −1.2 V, a frequency of 10 Hz, and a growth time of 60 min, to prepare the platinum nanocatalyst having an average particle size of 4 nm and an open surface structure. FIG. 10 is the SEM figure of the platinum nanocatalyst having an average particle size of 4 nm and an open surface structure.

EXAMPLE 8

Figure 11:
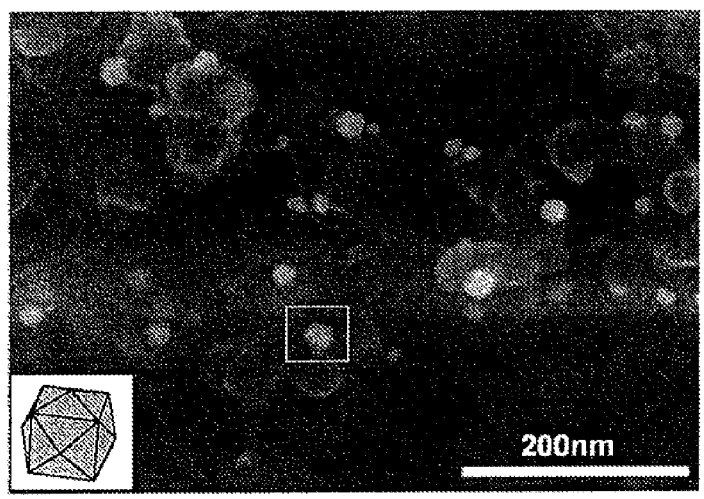
FIG. 11 is an image of the scanning electron microscope (SEM) of the platinum nanocatalyst having an average particle size of 32 nm prepared according to Example 8 of the present invention.
Figure 12:
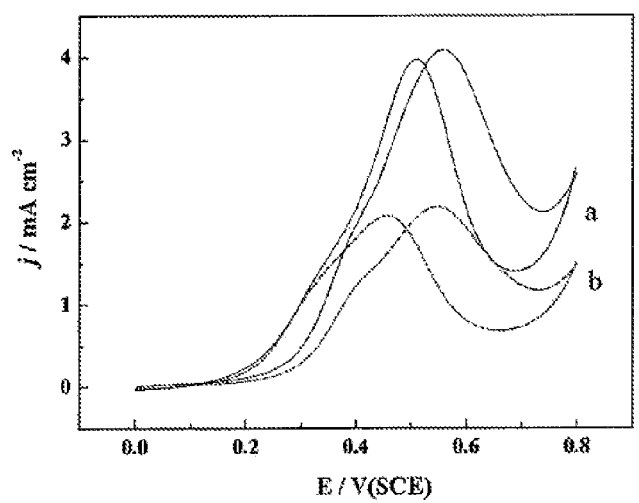
FIG. 12 is a catalytic activity charactering chart of the platinum nanocatalyst prepared according to Example 8 of the present invention to ethanol.

A preparation process similar to that in Example 7 is used when preparing the platinum nanocatalyst with exception that the growth time is 90 min to prepare a platinum nanocatalyst having an average particle size of 32 nm and an open surface structure. FIG. 11 is the SEM figure of the platinum nanocatalyst having an average particle size of 32 nm and an open surface structure. The nanoparticle circled in the figure has a platinum icositetrahedron structure, and its corresponding structure model figure is shown at the left corner. FIG. 12 characterizes the catalytic activity of the prepared platinum nanocatalyst having the opened structure towards ethanol, indicating that the catalytic activity per surface area is advantageous remarkably over the commercial platinum nanocrystal catalyst produced by the American company E-TEK.

EXAMPLE 9

Figure 13:
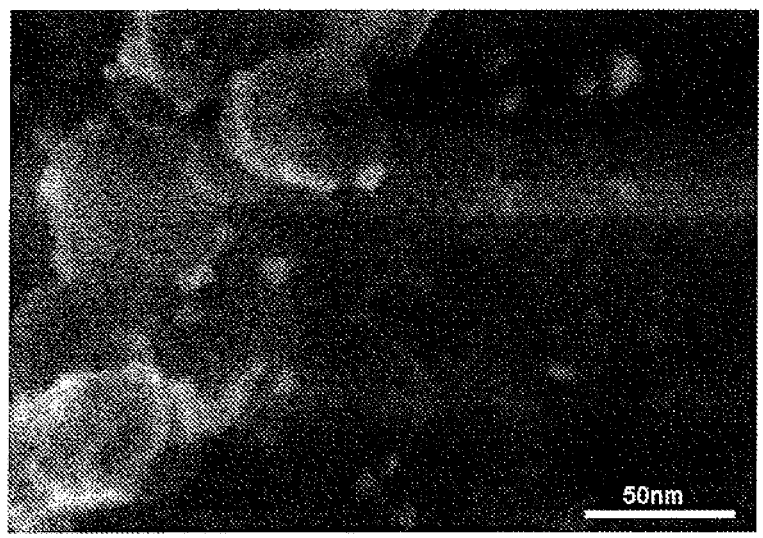
FIG. 13 is an image of the scanning electron microscope (SEM) of the platinum nanocatalyst having an average particle size of 9.5 nm prepared according to Example 9 of the present invention.
Figure 14:
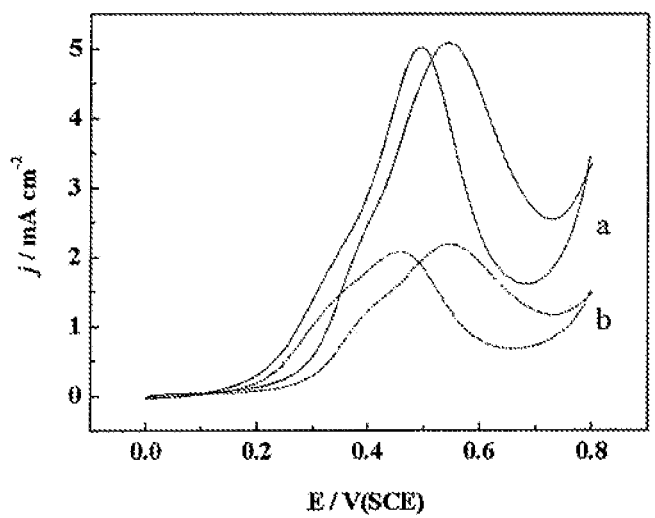
FIG. 14 is a catalytic activity charactering chart of the platinum nanocatalyst having an open structure prepared according to Example 9 of the present invention towards ethanol.

A preparation process similar to that in Example 7 is used when preparing the platinum nanocatalyst with exception that the growth time is 80 min to prepare a platinum nanocatalyst having an average particle size of 9.5 nm and an open surface structure. FIG. 13 is the SEM figure of the platinum nanocatalyst having an average particle size of 9.5 nm and an open surface structure. FIG. 14 characterizes the catalytic activity of the prepared platinum nanocatalyst having the open surface structure for ethanol oxidation, indicating that the analytic activity per surface area is advantageous remarkably over the commercial platinum nanocrystal catalyst produced by the American company E-TEK.

EXAMPLE 10

A preparation process similar to that in Example 5 is used when preparing the platinum nanocatalyst with exception that glassy carbon sheet is used as electrodes to prepare a platinum nanocatalyst having an open surface structure.

EXAMPLE 11

A preparation process similar to that in Example 5 is used when preparing the platinum nanocatalyst with exception that stainless steel is used as electrodes to prepare a platinum nanocatalyst having an open surface structure.

EXAMPLE 12

A preparation process similar to that in Example 7 is used when preparing the platinum nanocatalyst with exception that the reaction solution contains 0.1 g/L of carbon black as a carrier and 0.02 mM of potassium chloroplatinate as a metal precursor to prepare a platinum nanocatalyst having an open surface structure.

EXAMPLE 13

A preparation process similar to that in Example 7 is used when preparing the platinum nanocatalyst with exception that the reaction solution contains 0.02 mM of platinum tetrachloride as a metal precursor and 30 mM of ascorbic acid as a stabilizer to prepare a platinum nanocatalyst having an open surface structure.

EXAMPLE 14

A preparation process similar to that in Example 12 is used when preparing the platinum nanocatalyst with exception that the carbon black is replaced by mesoporous carbon as a carrier to prepare a platinum nanocatalyst having an open surface structure.

EXAMPLE 15

A preparation process similar to that in Example 12 is used when preparing the platinum nanocatalyst with exception that the carbon black is replaced by carbon nano-tubes as a carrier to prepare a platinum nanocatalyst having an open surface structure.

EXAMPLE 16

A preparation process similar to that in Example 13 is used when preparing the platinum nanocatalyst with exception that 10 mM of sodium citrate is used as a stabilizer to prepare a platinum nanocatalyst having an open surface structure.

EXAMPLE 17

A preparation process similar to that in Example 13 is used when preparing the platinum nanocatalyst with exception that 10 mM of hexadecyl trimethyl ammonium bromide is used as a stabilizer to prepare a platinum nanocatalyst having an open surface structure.

EXAMPLES 18 to 90

A preparation process similar to that in Example 1 is used with exception that the composition of the precursor reaction solution is changed. The prepared metal nanocatalyst having the open surface structure is the corresponding metal nanocatalyst. The composition of the precursor reaction solution and the prepared metal nanocatalyst having the open surface structure are shown in Table 1 (in Table 1, "the metal nanocatalyst having the open surface structure" is named metal nanocatalyst in short).

TABLE 1

| Example No. | A metal precursor | A carrier | A additive | An electrolyte | metal nanocatalyst |
|---|---|---|---|---|---|
| 18 | palladium chloride | carbon black | ascorbic acid | sulfuric acid | palladium nanocatalyst |
| 19 | palladium oxide | carbon black | ascorbic acid | sulfuric acid | palladium nanocatalyst |
| 20 | chloropalladic acid | carbon black | ascorbic acid | sulfuric acid | palladium nanocatalyst |
| 21 | palladium chloride | mesoporous carbon | sodium citrate | nitric acid | palladium nanocatalyst |
| 22 | palladium oxide | mesoporous carbon | sodium citrate | nitric acid | palladium nanocatalyst |
| 23 | chloropalladic acid | mesoporous carbon | sodium citrate | nitric acid | palladium nanocatalyst |
| 24 | palladium chloride | carbon nano-tubes | hexadecyl trimethyl ammonium bromide | perchloric acid | palladium nanocatalyst |
| 25 | palladium oxide | carbon nano-tubes | hexadecyl trimethyl ammonium bromide | perchloric acid | palladium nanocatalyst |
| 26 | chloropalladic acid | carbon nano-tubes | hexadecyl trimethyl ammonium bromide | perchloric acid | palladium nanocatalyst |
| 27 | iridium chloride | carbon black | ascorbic acid | sulfuric acid | iridium nanocatalyst |
| 28 | chloroiridic acid | carbon black | ascorbic acid | sulfuric acid | iridium nanocatalyst |
| 29 | iridium oxide | carbon black | ascorbic acid | sulfuric acid | iridium nanocatalyst |
| 30 | iridium chloride | mesoporous carbon | sodium citrate | nitric acid | iridium nanocatalyst |
| 31 | chloroiridic acid | mesoporous carbon | sodium citrate | nitric acid | iridium nanocatalyst |
| 32 | iridium oxide | mesoporous carbon | sodium citrate | nitric acid | iridium nanocatalyst |
| 33 | iridium chloride | carbon nano-tubes | hexadecyl trimethyl ammonium bromide | perchloric acid | iridium nanocatalyst |
| 34 | chloroiridic acid | carbon nano-tubes | hexadecyl trimethyl ammonium bromide | perchloric acid | iridium nanocatalyst |
| 35 | iridium oxide | carbon nano-tubes | hexadecyl trimethyl ammonium bromide | perchloric acid | iridium nanocatalyst |
| 36 | ruthenium chloride | carbon black | ascorbic acid | sulfuric acid | ruthenium nanocatalyst |
| 37 | ruthenium oxide | carbon black | ascorbic acid | sulfuric acid | ruthenium nanocatalyst |
| 38 | ruthenium chloride | mesoporous carbon | polyvinyl pyrrolidone | nitric acid | ruthenium nanocatalyst |
| 39 | ruthenium oxide | mesoporous carbon | polyvinyl pyrrolidone | nitric acid | ruthenium nanocatalyst |
| 40 | ruthenium chloride | carbon nano-tubes | hexadecyl trimethyl ammonium bromide | perchloric acid | ruthenium nanocatalyst |
| 41 | ruthenium oxide | carbon nano-tubes | hexadecyl trimethyl ammonium bromide | perchloric acid | ruthenium nanocatalyst |
| 42 | rhodium chloride | carbon black | ascorbic acid | sulfuric acid | rhodium nanocatalyst |
| 43 | rhodium oxide | carbon black | ascorbic acid | sulfuric acid | rhodium nanocatalyst |
| 45 | rhodium chloride | mesoporous carbon | polyvinyl pyrrolidone | nitric acid | rhodium nanocatalyst |
| 46 | rhodium oxide | mesoporous carbon | polyvinyl pyrrolidone | nitric acid | rhodium nanocatalyst |
| 47 | rhodium chloride | carbon nano-tubes | hexadecyl trimethyl ammonium bromide | perchloric acid | rhodium nanocatalyst |
| 48 | rhodium oxide | carbon nano-tubes | hexadecyl trimethyl ammonium bromide | perchloric acid | rhodium nanocatalyst |

TABLE 1-continued

| Example No. | A metal precursor | A carrier | A additive | An electrolyte | metal nanocatalyst |
|---|---|---|---|---|---|
| 49 | gold chloride | carbon black | ascorbic acid | sulfuric acid | gold nanocatalyst |
| 50 | gold oxide | carbon black | ascorbic acid | sulfuric acid | gold nanocatalyst |
| 51 | chloroauric acid | carbon black | ascorbic acid | sulfuric acid | gold nanocatalyst |
| 52 | gold chloride | mesoporous carbon | sodium citrate | nitric acid | gold nanocatalyst |
| 53 | gold oxide | mesoporous carbon | sodium citrate | nitric acid | gold nanocatalyst |
| 54 | chloroauric acid | mesoporous carbon | sodium citrate | nitric acid | gold nanocatalyst |
| 55 | gold chloride | carbon nano-tubes | hexadecyl trimethyl ammonium bromide | perchloric acid | gold nanocatalyst |
| 56 | gold oxide | carbon nano-tubes | hexadecyl trimethyl ammonium bromide | perchloric acid | gold nanocatalyst |
| 57 | chloroauric acid | carbon nano-tubes | hexadecyl trimethyl ammonium bromide | perchloric acid | gold nanocatalyst |
| 58 | silver nitrate | carbon black | ascorbic acid | sulfuric acid | silver nanocatalyst |
| 59 | silver oxide | carbon black | ascorbic acid | sulfuric acid | silver nanocatalyst |
| 60 | silver nitrate | mesoporous carbon | polyvinyl pyrrolidone | nitric acid | silver nanocatalyst |
| 61 | silver oxide | mesoporous carbon | polyvinyl pyrrolidone | nitric acid | silver nanocatalyst |
| 62 | silver nitrate | carbon nano-tubes | hexadecyl trimethyl ammonium bromide | perchloric acid | silver nanocatalyst |
| 63 | silver oxide | carbon nano-tubes | hexadecyl trimethyl ammonium bromide | perchloric acid | silver nanocatalyst |
| 64 | copper chloride | carbon black | ascorbic acid | sulfuric acid | copper nanocatalyst |
| 65 | copper oxide | carbon black | ascorbic acid | sulfuric acid | copper nanocatalyst |
| 66 | copper chloride | mesoporous carbon | polyvinyl pyrrolidone | nitric acid | copper nanocatalyst |
| 67 | copper oxide | mesoporous carbon | polyvinyl pyrrolidone | nitric acid | copper nanocatalyst |
| 68 | copper chloride | carbon nano-tubes | hexadecyl trimethyl ammonium bromide | perchloric acid | copper nanocatalyst |
| 69 | copper oxide | carbon nano-tubes | hexadecyl trimethyl ammonium bromide | perchloric acid | copper nanocatalyst |
| 70 | ferric chloride | carbon black | ascorbic acid | sodium hydroxide | ferric nanocatalyst |
| 71 | ferric sulfate | carbon black | ascorbic acid | sodium hydroxide | ferric nanocatalyst |
| 72 | ferric oxide | carbon black | ascorbic acid | sodium hydroxide | ferric nanocatalyst |
| 73 | ferric chloride | mesoporous carbon | sodium citrate | potassium hydroxide | ferric nanocatalyst |
| 74 | ferric sulfate | mesoporous carbon | sodium citrate | potassium hydroxide | ferric nanocatalyst |
| 75 | ferric oxide | mesoporous carbon | sodium citrate | potassium hydroxide | ferric nanocatalyst |
| 76 | ferric chloride | carbon nano-tubes | hexadecyl trimethyl ammonium bromide | sodium bicarbonate | ferric nanocatalyst |
| 77 | ferric sulfate | carbon nano-tubes | hexadecyl trimethyl ammonium bromide | sodium bicarbonate | ferric nanocatalyst |
| 78 | ferric oxide | carbon nano-tubes | hexadecyl trimethyl ammonium bromide | sodium bicarbonate | ferric nanocatalyst |
| 79 | cobalt chloride | carbon black | ascorbic acid | sulfuric acid | cobalt nanocatalyst |
| 80 | cobalt oxide | carbon black | ascorbic acid | sulfuric acid | cobalt nanocatalyst |
| 81 | cobalt chloride | mesoporous carbon | polyvinyl pyrrolidone | nitric acid | cobalt nanocatalyst |
| 82 | cobalt oxide | mesoporous carbon | polyvinyl pyrrolidone | nitric acid | cobalt nanocatalyst |
| 83 | cobalt chloride | carbon nano-tubes | hexadecyl trimethyl ammonium bromide | perchloric acid | cobalt nanocatalyst |
| 84 | cobalt oxide | carbon nano-tubes | hexadecyl trimethyl ammonium bromide | perchloric acid | cobalt nanocatalyst |
| 85 | nickel sulfate | carbon black | ascorbic acid | sodium hydroxide | nickel nanocatalyst |
| 86 | nickel oxide | carbon black | ascorbic acid | sodium hydroxide | nickel nanocatalyst |

TABLE 1-continued

| Example No. | A metal precursor | A carrier | A additive | An electrolyte | metal nanocatalyst |
|---|---|---|---|---|---|
| 87 | nickel sulfate | mesoporous carbon | polyvinyl pyrrolidone | potassium hydroxide | nickel nanocatalyst |
| 88 | nickel oxide | mesoporous carbon | polyvinyl pyrrolidone | potassium hydroxide | nickel nanocatalyst |
| 89 | nickel sulfate | carbon nano-tubes | hexadecyl trimethyl ammonium bromide | potassium bicarbonate | nickel nanocatalyst |
| 90 | nickel oxide | carbon nano-tubes | hexadecyl trimethyl ammonium bromide | potassium bicarbonate | nickel nanocatalyst |

References related to the present invention prior to the filing date

[1] Na Tian, Zhi-You Zhou, Shi-Gang Sun, Platinum Metal Catalysts of High-Index Surfaces: From Single-Crystal Planes to Electrochemically Shape-Controlled Nanoparticles. *J. Phys. Chem. C.,* 2008, 112: 19801-19817.

[2] Na Tian, Zhi-You Zhou, Shi-Gang Sun, Yong Ding, Zhong Lin Wang, Synthesis of Tetrahexahedral Platinum Nanocrystals with High-Index Facets and High Electro-Oxidation Activity. *Science,* 2007, 316: 732-735.

[3] Chinese Patent for Invention No. ZL 2007 1 0008741.4.

[4] Na Tian, Zhi-You Zhou, Neng-Fei Yu, Li-Yang Wang, Shi-Gang Sun, Direct Electrodeposition of Tetrahexahedral Pd Nanocrystals with High-Index Facets and High Catalytic Activity for Ethanol Electrooxidation, *J. Am. Chem. Soc.* 2010, 132: 7580-7581.

[5] Zhi-You Zhou, Zhi-Zhong Huang, De-Jun Chen, Qiang Wang, Na Tian, and Shi-Gang Sun, High-Index Faceted Platinum Nanocrystals Supported on Carbon Black as Highly Efficient Catalysts for Ethanol Electrooxidation, *Angew. Chem. Int. Ed.* 2010, 49: 411-414.

[6] Yan-Xin Chen, Sheng-Pei Chen, Zhi-You Zhou, Na Tian, Yan-Xia Jiang, Shi-Gang Sun, Yong Ding, Zhong Lin Wang, Tuning the Shape and Catalytic Activity of Fe Nanocrystals from Rhombic Dodecahedra and Tetragonal Bipyramids to Cubes by Electrochemistry, *J. Am. Chem. Sco.* 2009, 131: 10860-10862.

The invention claimed is:

1. A surface structure control and preparation system for a metal nanocatalyst, characterized in having a nucleation electrolytic cell, a distribution valve, at least two growth electrolytic cells, with one end of the distribution valve being connected to an output port of the nucleation electrolytic cell and the other end of the distribution valve being connected to input ports of all the growth electrolytic cells: the nucleation electrolytic cell has a cell body of the nucleation electrolytic cell and one pair of nucleation electrodes, the cell body of the nucleation electrolytic cell has an input port of a precursor reaction solution and an output port of a nucleation reaction solution, the input port of the precursor reaction solution, is connected outwardly to an input device of the precursor reaction solution and the outlet port of the nucleation reaction solution is connected to an entrance end of the distribution valve; the one pair of the nucleation electrodes are disposed inside the cell body, of the nucleation electrolytic cell, and said one pair of the nucleation electrodes are applied with nucleation programmed potential; each of the at least two growth electrolytic cells are provided with a cell body of the growth electrolytic cell and one pair of growth electrodes, the cell body of the growth electrolytic cell is equipped with an input port of the nucleation reaction solution and an outlet port of a product, the input port of the nucleation reaction solution is connected with the output port of the nucleation electrolytic cell via the distribution valve; one pair of growth electrodes are disposed inside the cell body of the growth electrolytic cell; and said one pair of growth electrodes are applied with growth programmed potential.

2. The surface structure control and preparation system for a metal nanocatalyst according to claim 1, wherein the cell body of the nucleation electrolytic cell has a structure the same as that of the cell body of the growth electrolytic cell; structures of cell bodies of the nucleation electrolytic cell and growth electrolytic cell include geometric shape, electrode material, size, and the disposition manner.

3. The surface structure control and preparation system for a metal nanocatalyst according to claim 1, wherein the nucleation electrodes are plate electrodes, the plate electrodes have an aspect ratio of 1-2:1, the length of the plate electrodes is 1 cm to 10 cm, and the distance between the plate electrodes is 20 μm to 2000 μm.

4. The surface structure control and preparation system for a metal nanocatalyst according to claim 3, wherein the plate electrodes are inserted in parallel inside the cell body of the nucleation electrolytic cell.

5. The surface structure control and preparation system for a metal nanocatalyst according to claim 1, wherein the nucleation electrodes are carbon electrodes, metal electrodes or alloy electrodes, and the alloy electrodes are stainless steel electrodes, wherein the nucleation electrodes serve as conductors to which the potentials apply.

6. The surface structure control and preparation system for a metal nanocatalyst according to claim 1, wherein the growth electrodes are plate electrodes, the plate electrodes have an aspect ratio of 1-2:1, the length of the plate electrodes is 1 cm to 10 cm, and the distance between the plate electrodes is 20 μm to 2000 μm.

7. The surface structure control and preparation system for a metal nanocatalyst according to claim 6, wherein the plate electrodes are inserted in parallel inside the cell body of the growth electrolytic cell.

8. The surface structure control and preparation system for a metal nanocatalyst according to claim 1, wherein the growth electrodes are carbon electrodes, metal electrodes or alloy electrodes, and the alloy electrodes may be stainless steel electrodes, wherein the growth electrodes serve as conductors to which the potentials apply.

9. The surface structure control and preparation system for a metal nanocatalyst according to claim 1, wherein the growth electrodes and the nucleation electrodes have the same geometric shape, size, and material.

10. The surface structure control and preparation system for a metal nanocatalyst according to claim 1, wherein the nucleation programmed potential consists of functional potentials of time; and the growth programmed potential consists of functional potentials of time.

11. The surface structure control and preparation system for a metal nanocatalyst according to claim 1, wherein the nucleation programmed potential is stepped functional potential and applied to one pair of electrodes in the nucleation electrolytic cell, with an upper potential limit of 1 V to 2 V together with a retention time of 10 s to 300 s, as well as a lower potential limit of −2 V to 0.5 V together with a retention time of 10 s to 300 s; and the growth programmed potential is a functional potential and applied to one pair of electrodes in the growth electrolytic cell, with an upper potential limit of 1 V to 5 V, a lower potential limit of −1.5 V to 0.5V, a potential variable frequency of 5 Hz to 50 Hz, and a growth time of 1 min to 200 min.

12. The surface structure control and preparation system for a metal nanocatalyst according to claim 1, wherein the precursor reaction solution consists of the following components with the content at mass ratio of: metal precursor:carrier:electrolyte:additive=1:(0.1 to 5):(10 to 100):(0.1 to 10) and the precursor reaction solution has a pH from 0.1 to 13.

13. The surface structure control and preparation system for a metal nanocatalyst according to claim 12, wherein the metal precursor is selected from the corresponding metal salt or metal oxide of the metal precursor, and the metal salt is selected from one of potassium chloroplatinate, sodium chloroplatinate, platinum nitrate, platinum chloride, palladium chloride, ammonium palladium chloride, iridium chloride, ruthenium chloride, rhodium chloride, osmium chloride, gold chloride, silver nitrate, copper chloride, ferric chloride, ferric sulfate, cobalt chloride, and nickel sulfate; the metal oxide is selected from one of platinum oxide, palladium oxide, iridium oxide, rhodium oxide, ruthenium oxide, osmium oxide, gold oxide, silver oxide, copper oxide, ferric oxide, cobalt oxide, and nickel oxide; and the metal precursor is selected from one of chloroplatinic acid, chloropalladic acid, chloroauric acid, and chloroiridic acid.

14. The surface structure control and preparation system for a metal nanocatalyst according to claim 12, wherein the carrier is selected from one of carbon black, active carbon, mesoporous carbon, and carbon nano-tubes; the electrolyte is selected from one of sulfuric acid, perchloric acid, nitric acid, sodium hydroxide, potassium hydroxide, sodium bicarbonate, and potassium bicarbonate; the additive is selected from one of ascorbic acid, citrate salt, glucose, oleylamine, oleic acid, hexadecylamine, hexadecyl trimethyl ammonium bromide, sodium lauryl benzenesulfate, N-isopropyl acrylamide, and polyvinyl pyrrolidone.

15. A surface structure control and preparation process for the metal nanocatalyst having an open surface structure, characterized in using the surface structure control and preparation system for the metal nanocatalyst according to claim 1, and comprising: 1) injecting the precursor reaction solution into the nucleation electrolytic cell, meanwhile, applying the nucleation programmed potential to one pair of electrodes in the nucleation electrolytic cell; the metal precursor undergoes a nucleation reaction under the action of the nucleation programmed potential to obtain the nucleation reaction solution having the metal crystal nucleus formed; 2) conveying the nucleation reaction solution containing the metal crystal nucleus to any one of the growth electrolytic cells through the distribution valve, meanwhile, applying the growth programmed potential to one pair of the electrodes in the growth electrolytic cell, the metal crystal nucleus in the nucleation reaction solution grow gradually under the action of the growth programmed potential with the shape and surface structure of the metal crystal being controlled at the same time, to grow a metal nanoscale crystal having an open surface structure; 3) controlling the growth time of the action of the growth programmed potential applied to one pair of electrodes in any one of the growth cells in step 2), to obtain the product of the metal nanocatalyst having an open surface structure and a desired size; and 4) discharging the product of the metal nanocatalyst having an open surface structure and the desired size obtained in step 3), collecting the product by centrifugal separation, to prepare the metal nanocatalyst having an open surface structure, wherein the metal nanocatalyst having an open surface structure is a single metal nanoscale crystal and has a high density of terrace atoms or active site on the surface thereof; said single metal nanoscale crystal is a single metal nanoscale simple-form crystal or a single metal nanoscale deformed crystal; said nanoscale simple-form crystal is a polyhedron, and the polyhedron is selected from one of tetrahedron, octahedron, cube, dodecahedron, tetrahexahedron, trisoctahedron, trapezohedron and hexoctahedron; and the single metal nanoscale deformed crystal is selected from one of deformation twins, deformed nanostick, and nano-thorn.

16. The surface structure control and preparation system for a metal nanocatalyst according to claim 12, wherein the mass ratio of: metal precursor:carrier:electrolyte:additive=1:(2.5 to 5):(10 to 30):(1 to 2).

17. The surface structure control and preparation system for a metal nanocatalyst according to claim 12, wherein the precursor reaction solution has a pH selected from 0.1 to 3, from 6.5 to 7.5, or from 10 to 13.

* * * * *